United States Patent [19]

Shimura

[11] Patent Number: 4,761,739

[45] Date of Patent: Aug. 2, 1988

[54] DENSITY CORRECTING METHOD AND APPARATUS FOR ENERGY SUBSTRACTION IMAGE

[75] Inventor: Kazuo Shimura, Kanagawa, Japan

[73] Assignee: Fuji Photo Film Co., Ltd., Kanagawa, Japan

[21] Appl. No.: 838,862

[22] Filed: Mar. 12, 1986

[30] Foreign Application Priority Data

Mar. 13, 1985 [JP] Japan ............................. 60-49668

[51] Int. Cl.$^4$ ................. H05B 33/12; G06F 15/68
[52] U.S. Cl. ................................. 364/414; 250/327.2
[58] Field of Search .................. 364/414; 250/327.2; 358/111

[56] References Cited

U.S. PATENT DOCUMENTS 4,394,737 7/1983 Komaki ............................ 364/414
4,590,517 5/1986 Kato et al.

Primary Examiner—Jerry Smith
Assistant Examiner—Gail O. Hayes
Attorney, Agent, or Firm—Sughrue, Mion, Zinn, Macpeak, and Seas

[57] ABSTRACT

In energy subtraction processing, a high energy image signal SH and a low energy image signal SL are detected from two sets of stimulable phosphor sheets respectively carrying a high energy image and a low energy image of the same object stored thereon. A difference signal Ssub for forming an image of a specific structure of the object is calculated as $Ssub = a \cdot SH - b \cdot SL + c$. The value c is adjusted to a value calculated as $c = m \cdot Smax + n \cdot Smin - a(m \cdot SHmax + n \cdot SHmin) + b(m \cdot SLmax + n \cdot SLmin)$ where Smax and Smin respectively denote the maximum density signal and the minimum density signal representing the maximum density and the minimum density desired in the subtraction image formed by the difference signal Ssub, SHmax and SHmin respectively denote the maximum value and the minimum value of the high energy image signal SH, SLmax and SLmin respectively denote the maximum value and the minimum value of the low energy image signal SL, and m and n respectively denote a constant including O.

4 Claims, 3 Drawing Sheets

DENSITY CORRECTING METHOD AND APPARATUS FOR ENERGY SUBSTRACTION IMAGE

BACKGROUND OF THE INVENTION

1. Field of the Invention

This invention relates to a method of correcting the density of a subtraction image obtained by subtraction processing of radiation images, and an apparatus for carrying out the method. This invention particularly relates to a method of correcting the density of a subtraction image obtained by digital subtraction processing of radiation images conducted by use of stimulable phosphor sheets so that background portions, soft tissue portions of an object, etc. in the subtraction image are reproduced always at a predetermined appropriate density, and an apparatus for carrying out the method.

2. Description of the Prior Art

Conventionally, a digital subtraction processing method is used for processing radiation images. In the method, two radiation images recorded under conditions different from each other are photoelectrically read out to obtain digital image signals, which are then subjected to subtraction processing with respect to the corresponding picture elements of the images, thereby to obtain a difference signal for forming an image of a specific structure contained in the radiation images. The method makes it possible to reproduce a radiation image of only the specific structure by use of the signal thus obtained.

Basically, subtraction processing is carried out by either the so-called temporal (time difference) subtraction processing method or the so-called energy subtraction processing method. In the former method, the image of a specific structure is extracted by subtracting the image signal of a radiation image obtained without injection of contrast media from the image signal of a radiation image in which the image of the specific structure is enhanced by the injection of contrast media. In the latter method, an object is exposed to radiations having energy distributions different from each other to obtain two radiation images respectively containing the images of a specific structure recorded on the basis of the intrinsic radiation energy absorption characteristics of the specific structure. Then, the image signals of the two radiation images are weighted appropriately, when necessary, and subjected to subtraction to extract the image of the specific structure.

Since subtraction processing is extremely effective for diagnostic purposes in image processings for medical X-ray photographs, it has recently attracted much attention, and research has continued to develop improved method by use of electronic technology. The processing technique is particularly called the digital subtraction processing method, or normally, digital radiography (abbreviated as "DR").

A novel digital subtraction processing method has been proposed, for example, in Japanese Unexamined Patent Publication No. 58(1983)-163340 corresponding to U.S. Pat. No. 4,590,517. The method comprises the steps of (i) using two or more stimulable phosphor sheets exhibiting an extremely wide latitude of exposure to a radiation, (ii) exposing the stimulable phosphor sheets to the radiation passing through the same object under different conditions to have radiation images of the object stored on the stimulable phosphor sheets, image information of the specific structure being different between the radiation images, (ii) detecting the radiation images by scanning the stimulable phosphor sheets with stimulating rays to obtain digital image signals, and (iv) conducting a digital subtraction processing by use of the digital image signals. The stimulable phosphor sheets comprise a stimulable phosphor which is able to store a part of the radiation energy when exposed to a radiation such as X-rays, $\alpha$-rays, $\beta$-rays, $\gamma$-rays, cathode rays or ultraviolet rays, and then emits light in proportion to the stored energy of the radiation when exposed to stimulating rays such as visible light, as disclosed for example in U.S. Pat. No. 4,258,264. The stimulable phosphor sheets exhibit an extremely wide latitude of exposure and a markedly high resolving power. Therefore, when digital subtraction processing is conducted by use of the radiation images stored in the stimulable phosphor sheets, it is possible to obtain a radiation image having an improved image quality, particularly a high diagnostic efficiency and accuracy, regardless of the amount of the radiation to which the stimulable phosphor sheets are exposed.

In the aforesaid energy subtraction processing, when a high energy image signal detected from a stimulable phosphor sheet which was exposed to a high energy radiation passing through an object is designated by SH, and a low energy image signal detected from a stimulable phosphor sheet exposed to a low energy radiation is designated by SL, subtraction processing of the image signals is conducted between corresponding picture elements of the radiation images as expressed by $$S_{sub} = a \cdot SH - b \cdot SL + c$$

where a and b denote weight factors and c denotes a bias component for adjusting the density of the energy subtraction image formed by the difference signal Ssub to a predetermined value.

In the prior technique, the ratio b/a of the factor b to the factor a is experimentally determined based on the image recording method, radiation absorption characteristics of the image recording portion of the object, and the like, and the bias component c is also determined experimentally. However, since the appropriate value of the bias component c changes markedly with the image recording conditions and the object, the density range of the subtraction image becomes unsuitable for viewing, particularly for diagnostic purposes, and it becomes not always possible to diagnose correctly.

SUMMARY OF THE INVENTION

The primary object of the present invention is to provide a method of correcting the density of an energy subtraction image wherein the density of a desired portion of the energy subtraction images is always adjusted approximately the same.

Another object of the present invention is to provide a method of correcting the density of an energy subtraction image wherein energy subtraction images of an improved image quality, particularly high diagnostic efficiency and accuracy, are obtained.

The specific object of the present invention is to provide an apparatus for carrying out the method.

The present invention provides a method of correcting the density of an energy subtraction image in energy subtraction processing of radiation images which includes the steps of exposing two sets of stimulable phosphor sheets respectively to a high energy radiation and a low energy radiation passing through the same object to have radiation images of said object stored on said stimulable phosphor sheets, at least a part of the image information of said object being different between said radiation images, scanning the respective stimulable phosphor sheets by stimulating rays to sequentially release the radiation energy stored on said stimulable phosphor sheets as light emission, photoelectrically detecting and converting the amounts of the emitted light respectively into a digital high energy image signal SH and a digital low energy image signal SL, and obtaining a difference signal Ssub for forming an image of a specific structure of said object by carrying out subtraction processing of said digital image signals between corresponding picture elements of said radiation images as expressed by $$Ssub = a \cdot SH - b \cdot SL + c,$$

wherein the improvement comprises adjusting said value c to a value calculated by $$c = m \cdot Smax + n \cdot Smin - a(m \cdot SHmax + n \cdot SHmin) + b(m \cdot SLmax + n \cdot SLmin) \quad (1)$$

where Smax and Smin respectively denote the maximum density signal and the minimum density signal representing the maximum density and the minimum density desired in the subtraction image formed by said difference signal Ssub, SHmax and SHmin respectively denote the maximum value and the minimum value of said high energy image signal SH, SLmax and SLmin respectively denote the maximum value and the minimum value of said low energy image signal SL, and m and n respectively denote a constant which may be 0.

In the method of the present invemntion, when the constant m is adjusted to 0, only the minimum density signal Smin, the minimum value SHmin and the minimum value SLmin may be determined. When the constant n is adjusted to 0, only the maximum density signal Smax, the maximum value SHmax and the maximum value SLmax may be determined. Each of the high energy image signal SH and the low energy image signal SL need not necessarily be the image signal detected from a single stimulable phosphor sheet and may, for example, be an image signal obtained by arithmetic averaging of the image signals detected from two stimulable phosphor sheets.

The present invention also provides an apparatus for correcting the density of an energy subtraction image in an energy subtraction processing system provided with a subtraction operation means for obtaining a difference signal Ssub for forming an image of a specific structure of an object by carrying out subtraction processing of a digital high energy image signal SH and a digital low energy image signal SL between corresponding picture elements of radiation images as expressed by $$Ssub = a \cdot SH - b \cdot SL + c,$$

said high energy image signal SH and said low energy image signal SL being detected respectively by image read-outs from two sets of stimulable phosphor sheets respectively exposed to a high energy radiation and a low energy radiation passing through the same object to have said radiation images of said object stored on said stimulable phosphor sheets, at least a part of the image information of said object being different between said radiation images, the apparatus for correcting the density of an energy subtraction image comprising:

(i) a signal creation means for creating at least one or the other of the maximum density signal Smax and the minimum density signal Smin representing the maximum density and the minimum density desired in a subtraction image formed by said difference signal Ssub, (ii) a characteristic value operation means for calculating at least one or the other of a combination of the maximum value SHmax of said high energy image signal SH with the maximum value SLmax of said low energy image signal SL and a combination of the minimum value SHmin of said high energy image signal SH with the minimum value SLmin of said low energy image signal SL, (iii) a bias component operation means for calculating a bias component c as $$c = m \cdot Smax + n \cdot Smin - a(m \cdot SHmax + n \cdot SHmin) + b(m \cdot SLmax + n \cdot SLmin)$$

where m and n respectively denote a constant which may be 0, based on said maximum density signals and said minimum density signals calculated by said characteristic value operation means and said signal creation means, and (iv) a bias component adjustment means for transmitting the value of said bias component c calculated by said bias component operation means to said subtraction operation means and using said value in said subtraction processing.

In the present invention, since the density at an arbitrary portion of the energy subtraction image can be adjusted to a desirable value, it is possible to adjust the density range of the energy subtraction image to the range suitable for viewing, and to improve the image quality, particularly the diagnostic accuracy and efficiency, of the energy subtraction image.

DESCRIPTION OF THE PREFERRED EMBODIMENTS

The present invention will hereinbelow be described in further detail with reference to the accompanying drawings.

Figure 1:
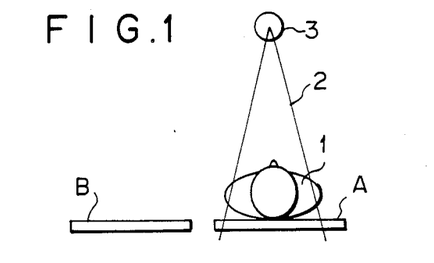
FIG. 1 is an explanatory view showing the radiation image recording step in the method of correcting the density of an energy subtraction image in accordance with the present invention.

FIG. 1 shows the step of exposing stimulable phosphor sheets A and B respectively to X-rays 2 of different levels of X-ray energy passing through the same object 1. First, the stimulable phosphor sheet A is exposed to X-rays 2 of a comparatively high energy level passing through the object 1 to have an X-ray image (high energy image) of the object 1 stored thereon. Then, the stimulable phosphor sheet A is quickly removed from the image recording position, and the stimulable phosphor sheet B is quickly moved to the image recording position. At the same time, the tube voltage of an X-ray source 3 is changed, and an X-ray image (low energy image) of the object 1 is stored on the stimulable phosphor sheet B by the X-rays 2 having a comparatively low energy level. At this time, the relationship between the positions of the stimulable phosphor sheet A and the object 1 and the relationship between the stimulable phosphor sheet B and the object 1 are maintained the same.

Figure 2:
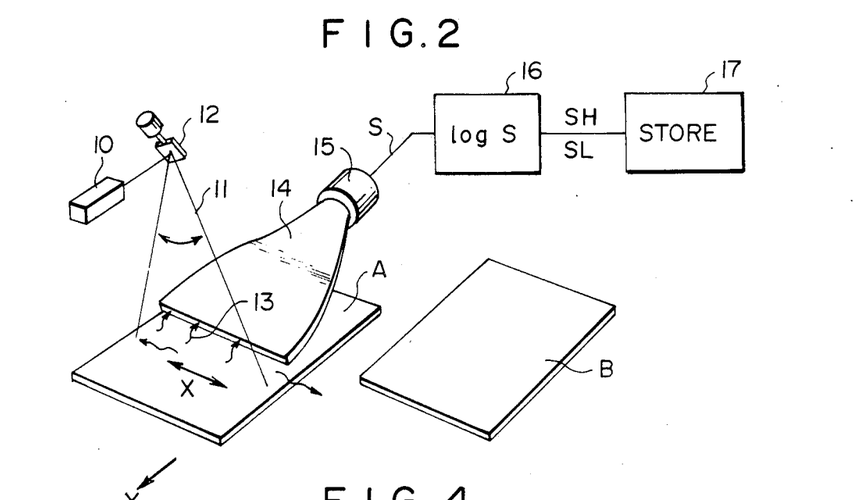
FIG. 2 is a schematic view showing the step of reading out the radiation images from the stimulable phosphor sheets carrying the radiation images stored thereon as shown in FIG. 1.

As a result, two radiation images differing from each other in at least a part of their image information are stored on the stimulable phosphor sheets A and B. From the stimulable phosphor sheets A and B carrying the X-ray images stored thereon, the X-ray images are read out by use of the image read-out means as shown in FIG. 2 to obtain digital image signals representing the X-ray images. First, while the stimulable phosphor sheet A is moved in the direction as indicated by the arrow Y to conduct sub-scanning, a laser beam 11 emitted by a laser beam source 10 is deflected in the direction as indicated by the arrow X by a scanning mirror 12 to conduct main scanning. In this manner, the stimulable phosphor sheet A is caused to release the X-ray energy stored thereon as light 13 in proportion to the X-ray energy. The emitted light 13 enters a light guide member 14, which is made by forming a transparent acrylic sheet, from one end face thereof. The light guide member 14 may be of a shape and a material as disclosed in U.S. Pat. No. 4,346,295. The light 13 is then guided through total reflection inside of the light guide member 14 up to a photomultiplier 15, and the amount of the light 13 is output as an image signal S by the photomultiplier 15. The image signal S is then converted into a digital high energy image signal SH of a logarithmic value (logS) by a log-converter 16 comprising an amplifier and an A/D converter. The digital high energy image signal SH is stored on a storage medium 17 such as a magnetic tape. Thereafter, the X-ray image stored on the other stimulable phosphor sheet B is read out therefrom in exactly the same manner as described above, and the digital low energy image signal SL thus obtained in stored on the storage medium 17.

Figure 3:
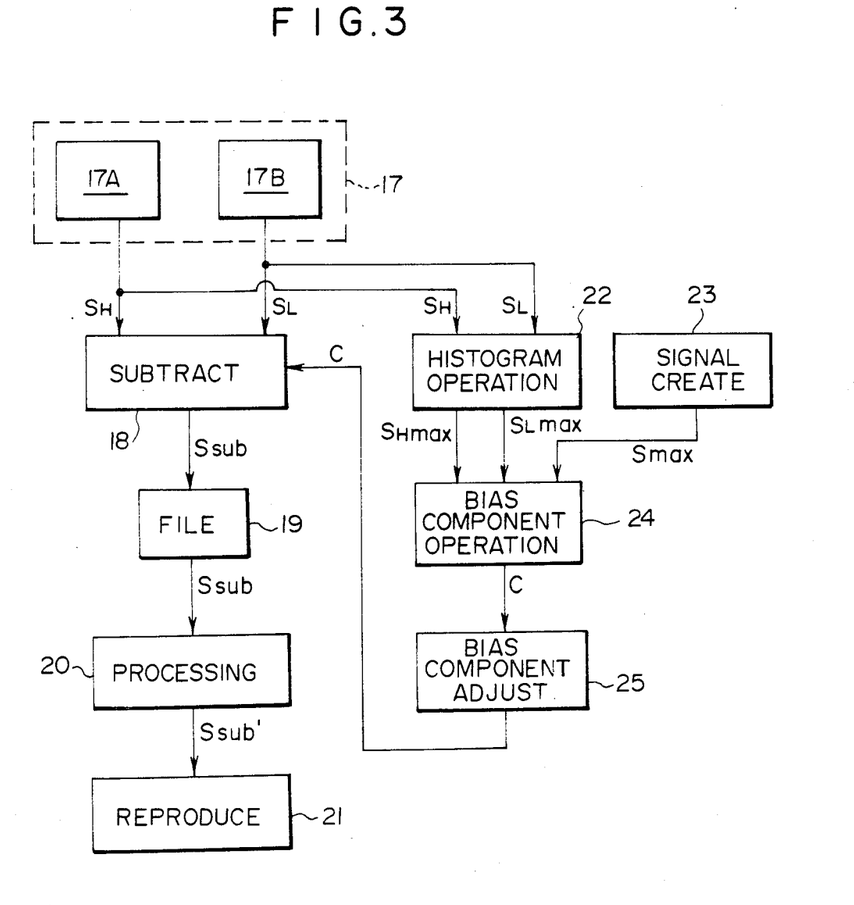
FIG. 3 is a block diagram showing an energy subtraction processing wherein an embodiment of the method of correcting the density of an energy subtraction image in accordance with the present invention is employed.

Thereafter, subtraction processing is conducted by use of the high energy image signal SH and the low energy image signal SL obtained as described above. FIG. 3 shows the flow of the subtraction processing wherein an embodiment of the method of correcting the densiyty of a subtraction image in accordance with the present invention is employed. First the digital image signals SH and SL are read respectively from image files 17A and 17B in the storage medium 17, and are sent to a subtraction operation circuit 18. The subtraction operation circuit 18 weights the digital image signals SH and SL appropriately and conducts subtraction processing between the digital image signals SH and SL with respect to the corresponding picture elements to obtain a digital difference signal Ssub as expressed by $$Ssub = a \cdot SH - b \cdot SL + c \tag{2}$$

where a and b denote weight factors, and c denotes a bias component for adjusting the density approximately to a predetermined value. The difference signal Ssub thus obtained is stored in an image file 19 and is then sent to an image processing circuit 20 which conducts gradation processing or the like on the difference signal Ssub.

Figure 4:
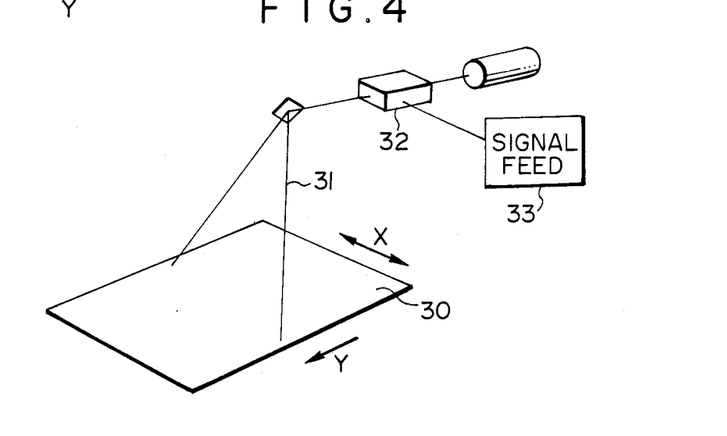
FIG. 4 is a schematic view showing an example of the subtraction image reproducing system.

A difference signal Ssub' obtained by the gradation processing or the like in the image processing circuit 20 is sent to an image reproducing apparatus 21, for example, a display device such as a cathode ray tube (CRT) or a point-by-point scanning apparatus which reproduces a subtraction image by use of the difference signal Ssub'. FIG. 4 shows an apparatus for reproducing the image by point-by-point scanning as an example of the subtraction image reproducing system. A photosensitive film 30 is moved in the sub-scanning direction as indicated by the arrow Y, and at the same time a laser beam 31 is deflected onto the photosensitive film 30 in the main scanning direction is indicated by the arrow X. The laser beam 31 is modulated by an A/O modulator 32 with an image signal sent from an image signal feeder 33, thereby to form a visible image on the photosensitive film 30. By using the difference signal Ssub' as the modulating image signal, it is possible to reproduce a visible image wherein only the specific structure is extracted by the digital subtraction processing on the photosensitive film 30.

The density range of the energy subtraction image reproduced on the photosensitive film 30 is not always suitable for viewing owing to the image recording conditions, the object, or the like.

As described above, the density of the subtraction image changes with the bias component c in Formula (2). Therefore, in the method of the present invention, the bias component c is adjusted so that the density of the subtraction image becomes appropriate. Specifically, as shown in FIG. 3, the high energy image signal SH and the low energy image signal SL are sent to a histogram operation circuit 22 which calculates the maximum value SHmax of the high energy image signal SH and the maximum value SLmax of the low energy image signal SL. Further, a signal creation circuit 23 creates the maximum density signal Smax representing the maximum density desired in the energy subtraction image formed by the difference signal Ssub. The signal creation circuit 23 may output an optimal Smax value predetermined experimentally. Or, for example, when the subtraction image is to be obtained as a hard copy by use of the apparatus shown in FIG. 4 or the like, a hard copy density chart may be prepared, a density selected on the chart may be designated in terms of a chart number or the like, and the signal creation circuit 23 may be formed to create the image signal corresponding to the designated density.

The maximum value SHmax, the maximum value SLmax and the maximum density signal Smax obtained as described above are input to a bias component operation circuit 24. Based on the maximum value SHmax, the maximum value SLmax and the maximum density signal Smax, the bias component operation circuit 24 calculates the bias component c as $$c = Smax - a \cdot SHmax + b \cdot SLmax \quad (3)$$

Formula (3) is equivalent to Formula (1) wherein $m=1$ and $n=0$. As described above, the weight factors a and b may be determined experimentally.

The value of the bias component c is input to a bias component setting circuit 25 which transmits the value to he subtraction operation circuit 18 to adjust it in the subtraction processing of Formula (2).

When the bias component c is adjusted in this manner, the maximum density of the subtraction image formed by the difference signal Ssub obtained by the subtraction processing of Formula (2) becomes the density represented by the maximum density signal Smax. At this time, by selecting Smax so that the density range of the subtraction image becomes suitable for viewing, it becomes possible to diagnose the image accurately and easily.

Figure 5:
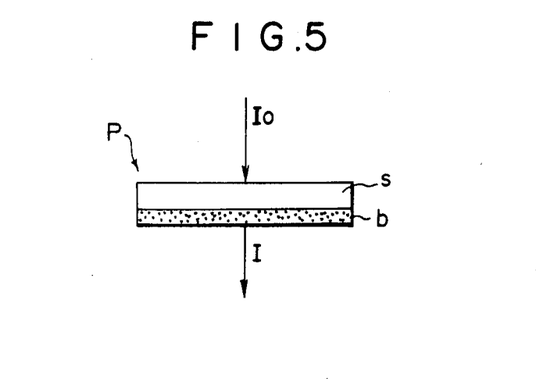
FIG. 5 is an explanatory view showing the radiation decay characteristics of an object.

By adjusting the bias component c in this manner, the maximum density of the subtraction image is fixed as described in detail below. In general, as shown in FIG. 5, a radiation energy level I after a radiation of an energy level Io passes through an object P comprising the soft tissue s and the bone b is expressed by $$I = Io \cdot \exp^{(-us \cdot ts - ub \cdot tb)} \quad (4)$$

where us and ts respectively designate the radiation decay factor and the thickness of the soft tissue s, and ub and tb respectively designate the radiation decay factor and the thickness of the bone b.

Figure 6:
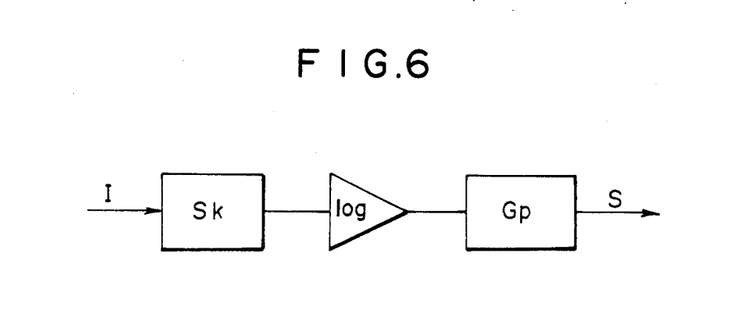
FIG. 6 is an explanatory view showing the conversion of radiation energy into an electric signal in the method of the present invention.

As shown in FIG. 6, in the case where the radiation energy level I (actually, the level of light emitted by the stimulable phosphor sheet upon stimulation thereof by stimulating rays, which corresponds to the radiation energy level I) is converted into the electrical signal S by a transmission system of an amplification degree Sk and a scale factor Gp and including a logarithmic converter, there holds the formula of $$S = Gp \cdot \log (I \cdot Sk).$$

Substitution of Formula (4) into this formula gives $$S = Gp \cdot \log (Io) - Gp \cdot us \cdot ts - Gp \cdot ub \cdot tb + Gp \cdot \log (Sk) = Ko - Ks \cdot ts - Kb \cdot tb \quad (5)$$

where $Ko = Gp \cdot \log (Io) - Gp \cdot \log (Sk)$, $Ks = Gp \cdot us$, and $kb = Gp \cdot ub$.

(I)

First, the case where the original images used for the energy subtraction processing, i.e. the high energy image and the low energy image, include a background portion at which the radiation directly impinges upon the stimulable phosphor sheet without passing through the object will be described hereinbelow.

(High energy image)

From Formula (5), the high energy image signal SH is expressed by $$SH = KoH - KsH \cdot ts - KbH \cdot tb \quad (6)$$

where KoH, KsH and KbH respectively designate the values of Ko, Ks and Kb in the high energy image. When a part of the image is the background portion, the maximum value (i.e. the value when KsH·ts and KbH·tb are 0) KoH of Formula (6) becomes the maximum value of the high energy image signal SH. That is, maximum value SHmax=KoH.

(Low energy image)

Similarly to the case of the high energy image, the low energy image signal SL is expressed by $$SL = KoL - KsL \cdot ts - KbL \cdot tb \quad (7)$$

where KoL, KsL and KbL respectively designate the values of Ko, Ks and Kb in the low energy image. Also, maximum value SLmax=KoL.

(Energy subtraction image)

An image wherein the soft tissue image is erased will first be considered. Substitution of Formulas (6) and (7) into Formula (2) gives $$Ssub = a \cdot KoH - b \cdot KoL + c - (a \cdot KsH - b \cdot KsL)ts - (a \cdot KbH - b \cdot KbL)tb \quad (8)$$

In the energy subtraction image wherein the soft tissue image is erased, the weight factors a and b are selected so that $$a \cdot KsH - b \cdot KsL = 0,$$

$$(a \cdot KbH - b \cdot KbL) \geq 0.$$

Therefore, there it holds that $$Ssub = a \cdot KoH - b \cdot KoL + c - (a \cdot KbH - b \cdot KbL)tb.$$

The maximum value representing the maximum density (density at the background portion) of the difference signal Ssub is $a \cdot KoH - b \cdot KoL + c$, and the maximum value is equal to the maximum density signal Smax. Therefore, $$Smax = a \cdot KoH - b \cdot KoL + c \quad (9)$$

As described above, $$KoH = SHmax, \quad KoL = SLmax.$$

Substitution of these formulas into Formula (9) gives $$Smax = a \cdot SHmax - b \cdot SLmax + c.$$

From this formula, Formula (3) is obtained. When the bias component c is adjusted to the value calculated by Formula (3), the maximum density of the energy subtraction image is adjusted to the density represented by the maximum density signal Smax.

For an image wherein the bone image is erased, Formula (3) holds in the same manner as the case of the image wherein the soft tissue image is erased, except that the weight factors a and b are selected so that $(a \cdot KbH - b \cdot KbL) = 0$ in Formula (8).

(II)

Then, the case where the original images include no background portion will be considered below.

(High energy image)

As in the case where the original images include a background portion, it holds that $$SH = KoH - KsH \cdot ts - KbH \cdot tb.$$

Since the high energy image includes no background portion, the maximum value SHmax of the high energy image signal SH is normally considered to represent the maximum density portion of the soft tissue, i.e. the thinnest portion of the soft tissue. The value ts is represented by $$ts = tso + ts' \tag{10}$$

where tso designates the thickness of the soft tissue s which the maximum value SHmax represents. Substitution of Formula (10) into Formula (6) gives $$SH = KoH' - KsH \cdot ts' - KbH \cdot tb \tag{11}$$

where $KoH' = KoH - KsH \cdot tso$. Therefore, SHmax = KoH'.

(Low energy image)

Even though the X-ray energy is low, the image portion at which the density is the maximum is considered to be the thinnest portion of the soft tissue as in the case of the high energy image. Therefore, in the same manner as the case of the high energy image, Formula (7) gives $$SL = KoL' - KsL \cdot ts' - KbL \cdot tb \tag{12}$$

where $KoL' = KoL - KsL \cdot tso$. Accordingly, SLmax = KoL'.

(Energy subtraction image)

An image wherein the soft tissue image is erased will first be considered. Substitution of Formulas (11) and (12) into Formula (2) gives $$Ssub = a \cdot KoH' - b \cdot KoL' + c - (a \cdot KsH - b \cdot KsL)ts' - (a \cdot KbH - b \cdot KbL)tb.$$

In the energy subtraction image wherein the soft tissue image is erased, the weight factors a and b are selected so that $$(a \cdot KsH - b \cdot KsL) = 0,$$

$$(a \cdot KbH - b \cdot KbL) \geq 0.$$

Therefore, it holds that $$Ssub = a \cdot KoH' - b \cdot KoL' + c - (a \cdot KbH - b \cdot KbL)tb.$$

The maximum value represents the maximum density (density at the bone portion of the difference signal Ssub is $a \cdot KoH' - b \cdot KoL' + c$, and the maximum value is equal to the maximum density signal Smax. Therefore, $$Smax = a \cdot KoH' - b \cdot KoL' + c.$$

Thus Formula (3) holds.

Formula (3) holds in the same manner also in the image wherein the bone image is erased.

In the aforesaid embodiment, the constants in Formula (1) are adjusted to m=1 and n=0, and the maximum density of the energy subtraction image is adjusted to a perdetermined value based on the maximum value SHmax of the high energy image signal SH and the maximum value SLmax of the low energy image signal SL. However, depending on the radiation image recording portion, it is also possible to adjust the constant to m=0 and n=1 and to define the maximum density of the energy subtraction image based on the minimum value SHmin of the high energy signal SH and the minimum value SLmin of the low energy image signal SL. This method will hereinbelow be described in detail.

Figure 7:
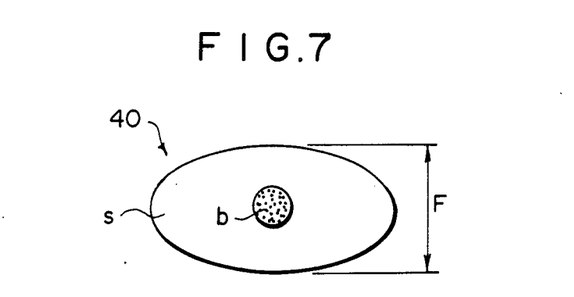
FIG. 7 is a schematic view showing the general shape of the object in the formation of the energy subtraction image by the method of the present invention.

As shown in FIG. 7, in the radiation image recording of an object 40 which is typical of a part of the human body, the portion at which the body thickness F is the largest coincides with the portion at which the bone b is the thickest. This is hereinafter referred to as "Assumption 1".

(High energy image)

Within the radiation energy range in the ordinary radiation image recording, the radiation decay factor ub of the bone b is larger than the radiation decay factor us of the soft tissue s. Therefore, from Assumption 1, the image signal detected at the portion where the body thickness is the largest becomes the minimum value SHmin of the high energy image signal SH. From Formula (6), the high energy image signal SH is expressed by $$\begin{aligned} SH &= KoH - KsH \cdot ts - KbH \cdot tb \\ &= KoH - KsH \cdot TsH + KsH(TsH - ts) - \\ &\quad KbH \cdot TbH + KbH(TbH - tb) \end{aligned}$$

where TsH and TbH respectively designate the thickness of the soft tissue s and the bone b at the portion where the body thickness is the largest. Therefore, it holds that $$SH = KoH' + KsH \cdot ts' + KbH \cdot tb' \tag{13}$$

where $KoH' = KoH - KsH \cdot TsH - KbH \cdot TbH$, $ts' = TsH - ts$, and $tb' = TbH - tb$. Since $KsH \geq 0$, $ts' \geq 0$, $tb' \geq 0$, the minimum value SHmin of the high energy image signal SH becomes equal to KoH'.

(Low energy image)

As in the case of the high energy image, the low energy image signal SL is expressed by $$SL = KoL' + KsH \cdot ts' + KbH \cdot tb' \tag{14}$$

where $KoL' = KoL - KsL \cdot TsL - KbL \cdot TbL$, $ts' = TsH - ts$, and $tb' = TbH - tb$. Therefore, like the case of the high energy image, the minimum value SLmin of the low energy image signal SL becomes equal to KoL'.

(Energy Subtraction image)

An image wherein the bone image is erased will first be considered. Substitution of Formulas (13) and (14) into Formula (2) yields $$Ssub = a \cdot KoH' - b \cdot KoL' + c + (a \cdot KsH - b \cdot KsL)ts' \\ + (a \cdot KbH - b \cdot KbL)tb'.$$

Since the weight factors a and b are selected so that $$(a \cdot KbH - b \cdot KbL) = 0,$$

there holds the formula of $$Ssub = a \cdot KoH' - b \cdot KoL' + c + (a \cdot KsH - b \cdot KsL)ts'.$$

Since $(a \cdot KsH - b \cdot KsL) \geq 0$, and $ts' \geq 0$, the minimum value representing the minimum density of the difference signal Ssub is $a \cdot KoH' - b \cdot KoL' + c$. Since the minimum value is the minimum density Smin, $$Smin = a \cdot KoH' - b \cdot KoL' + c.$$

That is, $$c = S\text{min} - a \cdot KoH' + b \cdot KoL' \quad (15)$$

Thus the bias component c at which the desired minimum density is obtained is defined by the minimum value KoH' of the high energy image signal SH and the minimum value KoL' of the low energy image signal SL.

Also in the case of an image whrein the soft tissue image is erased, Formula (15) holds. By using the bias component c calculated by Formula (15), is is possible to adjust the minimum density of the bone portion in the energy subtraction image to the desired value.

When the Assumption 1 is not satisfied, the minimum density of the energy subtraction image cannot be defined by adjusting the bias component c in the manner described above. However, in the actual radiation image recording, the Assumption 1 is generally satisfied. In such a case, the minimum density of the energy subtraction image may be defined as described above. Even when the radiation image recording is conducted under conditions slightly deviating from Assumption 1, is possible to adjust the minimum density of the energy subtraction image approximately constant by adjusting the bias component c in the manner described above.

When the Assumption 1 is satisfied, it is also possible to adjust the constants m and n in Formula (1) to m=n=1, to calculate the bias component c from the maximum value SHmax and the minimum value SHmin of the high energy image signal SH, and the maximum value SLmax and the minimum value SLmin of the low energy image signal SL, and to adjust a desired density between the maximum density and the minimum density in the energy subtraction image to a predetermined value.

In order to calculate the maximum values SHmax and SLmax, or the minimum values SHmin and SLmin of the high energy image signal SH and the low energy image signal SL, not only the histogram operation circuit 22 shown in FIG. 3 but any other means may also be used. For example, there may be used a maximum or minimum value operation means based on the sequential comparison method for storing the original high energy image signal SH (or the low energy image signal SL) was the maximum value (or the maximum value), comparing the stored maximum value (or the minimum value) with the high energy image signal SH (or the low energy image signal SL) which is input next, storing the larger value as the maximum value (or storing the smaller value as the minimum value), and repeating this operation processing up to the signal which is input last.

In the case where preliminary read-out as disclosed, for example, in Japanese Unexamined Patent Publication No. 58(1983)-89245 is conducted during read-out of the high energy image and the low energy image and the maximum values or the minimum values of the density signals are determined based on teh preliminary read-out data before final read-out, the values may be used as the maximum values SHmax and SLmax or the minimum values SHmin and SLmin. Therefore, in this case, the method of the present invention may be carried out without using the histogram operation circuit 22. The maximum values SHmax and SLmax or the minimum values SHmin and SLmin may be determined from the entire areas of the high energy image and the low energy image, or from a part of the image areas common to the high energy image and the low energy image.

In the aforesaid embodiment, a single stimulable phosphor sheet is used for recording each of the high energy image and the low energy image, and therefore the high energy image signal SH and the low energy image signal SL are detected from a single stimulable phosphor sheet. However, it is also possible to use two or more stimulable phosphor sheets for recording the high energy image or the low energy image, and to use a signal obtained by arithmetic averaging of the image signals detected from the stimulable phosphor sheets as the high energy image signal SH or the low energy image signal SL. In this case, radiations used for recording the high energy image or the low energy image on the respective stimulable phosphor sheets need not necessarily be of the same energy.

Further, in the aforesaid embodiment, recording of the high energy image and the low energy image respectively on the stimulable phosphor sheets A and B is conducted by independently emitting a high energy radiation and a low energy radiation onto the respective sheets. However, recording of the high energy image and the low energy image on two sets of sheets is not limited to the aforesaid method. For example, as disclosed in Japanese Unexamined Patent Publication No. 59(1984)-83486, corresponding to U.S. Ser. No. 883,429, a stack of the stimulable phosphor sheets or a stimulable phosphor sheet-filter stack may be exposed to a radiation by a single operation. Thus any image recording method may be used insofar as two sets of the stimulable phosphor sheets are respectively exposed to a high energy radiation and a low energy radiation passing through the same object.

I claim:

1. A method of obtaining a radiation image including the steps of: exposing two sets of stimulable phosphor sheets respectively to high energy radiation and low energy radiation passing through the same object to store radiation images of said object stored in said stimulable phosphor sheets, at least a part of the image information of said object being different between said radiation images, scanning the respective stimulable phosphor sheets with stimulating rays to sequentially release the radiation energy stored in said stimulable phosphor sheets in the form of light emission, photoelectrically detecting and converting the respective amounts of emitted light into a digital high energy image signal SH and a digital low energy image signal SL, and carrying out subtraction processing of said digital image signals between corresponding picture elements of said radiation images by subtracting said low energy image signal SL weighted by a first value b from said high energy image signal SH weighted by a second value a to obtain a preliminary difference signal and adding a bias component for adjusting density of said preliminary difference signal to obtain a final difference signal for obtaining an image of a specific structure of said object, said bias component being a third value c, said final difference signal being expressed by $$S\text{sub} = a \cdot SH - b \cdot SL + c,$$

and further including the step of adjusting said value c to a value calculated by $$c = m \cdot S\text{max} + n \cdot S\text{min} - a(m \cdot SH\text{max} + n \cdot SH\text{min}) + b(m \cdot SL\text{max} + n \cdot SL\text{min})$$

where Smax and Smin respectively denote the maximum density signal and the minimum density signal representing the maximum density and the minimum density desired in the subtraction image formed by said difference signal Ssub, SHmax and SHmin respectively denote the maximum value and the minimum value of said high energy image signal SH, SLmax and SLmin respectively denote the maximum value and the minimum value of said low energy image signal SL, and m and n respectively denote a constant which may be 0, and the step of reproducing said radiation image from said final difference signal Ssub.

2. A method as defined in claim 1 wherein at least one set of said two sets of stimulable phosphor sheets is constituted by two or more stimulable phosphor sheets, and said high energy image signal SH or said low energy image signal SL is obtained by arithmetic averaging of digital image signals obtained by detecting the light emitted by said two or more stimulable phosphor sheets.

3. An apparatus for producing a radiation image, said apparatus comprising: means for exposing two sets of stimulable phosphor sheet respectively to high energy radiation and low energy radiation passing through the same object and for storing radiation images of said object in said stimulable phosphor sheets, at least a part of the image information of said object being different between said radiation images, means for scanning the respective stimulable phosphor sheets with stimulating rays for sequentially releasing the radiation energy stored in said stimulable phosphor sheets in the form of light emission, means for photoelectrically detecting and converting light emitted from said two sets of stimulable phosphor sheets into a digital high energy image signal SH and a digital low energy image signal SL, respectively, subtraction operation means including:

means for obtaining difference signal Ssub for forming an image of a specific structure of an object by carrying out subtraction processing on said digital high energy image signal SH and said digital low energy image signal SL between corresponding picture elements of said radiation images as expressed by $$S\text{sub} = a \cdot SH - b \cdot SL + c,$$

wherein the value c is a bias component for adjusting the density of said difference signal Ssub, signal creation means for creating at least one or the other of a maximum density Smax and a minimum density signal Smin respectively representing the maximum density and the minimum density desired in a subtraction image formed by said difference signal Ssub, characteristic value operation means for calculating at least one or the other of a combination of a maximum value SHmax of said high energy image signal SH with a maximum value SLmax of said low energy image signal SL and a combination of the minimum value SHmin of said high energy image signal SH with the minimum value SLmin of said low energy image signal SL, bias operation means for calculating said bias component c according to the following relationship $$c = m \cdot S\text{max} + n \cdot S\text{min} - a(m \cdot SH\text{max} + n \cdot SH\text{min}) + b(m \cdot SL\text{max} + n \cdot SL\text{min})$$

where m and n respectively denote constants which may be 0, based on said maximum density signals and said minimum density signals calculated by said characteristic value operation means and said signal creation means, bias component adjustment means for transmitting the value of said bias component c calculated by said bias component operation means to said subtraction operation means, and means for reproducing said image from said difference signal Ssub.

4. An apparatus as defined in claim 3 wherein at least one set of said two sets of stimulable phosphor sheets is constituted by two or more stimulable phosphor sheets, and said high energy image signal SH or said low energy image signal SL is obtained by arithmetic averaging of digital image signals obtained by detecting the light emitted by said two or more stimulable phosphor sheets.

* * * * *